US009356858B2

(12) United States Patent
Vasseur et al.

(10) Patent No.: US 9,356,858 B2
(45) Date of Patent: May 31, 2016

(54) REDIRECTING TRAFFIC VIA TUNNELS TO DISCOVERED DATA AGGREGATORS

(71) Applicant: Cisco Technology, Inc., San Jose, CA (US)

(72) Inventors: Jean-Philippe Vasseur, Saint Martin d'Uriage (FR); Shmuel Shaffer, Palo Alto, CA (US); Sandeep J. Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/474,655

(22) Filed: Sep. 2, 2014

(65) Prior Publication Data

US 2015/0030033 A1    Jan. 29, 2015

Related U.S. Application Data

(62) Division of application No. 13/164,708, filed on Jun. 20, 2011, now Pat. No. 8,891,534.

(51) Int. Cl.
| | |
|---|---|
| *H04L 12/717* | (2013.01) |
| *H04W 40/22* | (2009.01) |
| *H04W 40/24* | (2009.01) |
| *H04W 40/26* | (2009.01) |
| *H04L 12/707* | (2013.01) |

(52) U.S. Cl.
CPC ............... *H04L 45/42* (2013.01); *H04L 45/22* (2013.01); *H04W 40/22* (2013.01); *H04W 40/246* (2013.01); *H04W 40/26* (2013.01)

(58) Field of Classification Search
CPC ....................................................... H04L 12/26
See application file for complete search history.

(56) References Cited

U.S. PATENT DOCUMENTS

| 7,076,543 B1 | 7/2006 | Kirti et al. |
| 7,096,272 B1 | 8/2006 | Raman |
| 7,171,491 B1 * | 1/2007 | O'Toole et al. ............... 709/244 |

(Continued)

OTHER PUBLICATIONS

Finnie, A., "Notification of Transmittal of the International Search Report and the Written Opinion of the International Searching Authority, or the Declaration", Patent Cooperation Treaty, Nov. 30, 2012, 15 pages, PCT/US2012/043286, European Patent Office, Rijswijk, Netherlands.

(Continued)

*Primary Examiner* — Marcus R Smith
*Assistant Examiner* — Omeed D Rahgozar
(74) *Attorney, Agent, or Firm* — Parker Ibrahim & Berg LLC; James M. Behmke; Stephen D. LeBarron

(57) ABSTRACT

In one embodiment, a data aggregator discovery (DAD) message may be distributed by an associated data aggregator, the DAD message identifying the initiating data aggregator, and comprising a recorded route taken from the data aggregator to a receiving particular node as well as a total path cost for the particular node to reach a root node of the DAG through the recorded route and via the data aggregator. The receiving particular node determines a path cost increase (PCI) associated with use of the data aggregator based on the total path cost as compared to a DAG-based path cost for the particular node to reach the root node via the DAG. If the PCI is below a configured threshold, the particular node may redirect traffic to the data aggregator as source-routed traffic according to the recorded route. The traffic may then be aggregated by the data aggregator, accordingly.

11 Claims, 12 Drawing Sheets

(56) References Cited

U.S. PATENT DOCUMENTS

| | | | |
|---|---|---|---|
| 7,318,094 | B1 | 1/2008 | Kirti et al. |
| 7,483,414 | B2 | 1/2009 | Grove et al. |
| 7,543,063 | B1 | 6/2009 | Grove et al. |
| 7,583,593 | B2 | 9/2009 | Guichard et al. |
| 8,441,958 | B2 * | 5/2013 | Thubert et al. ............... 370/254 |
| 2006/0126495 | A1 * | 6/2006 | Guichard et al. ............. 370/216 |
| 2006/0266832 | A1 | 11/2006 | Howarth et al. |
| 2007/0153707 | A1 | 7/2007 | Thubert et al. |

OTHER PUBLICATIONS

Finnie, A., "Invitation to Pay Additional Fees and, Where Applicable, Protest Fee", Patent Cooperation Treaty, Sep. 24, 2012, 8 pages, PCT/US2012/043286, European Patent Office, Rijswijk, Netherlands.

Gnawali, et al., "The Minimum Rank Objective Function with Hysteresis", IETF Trust, Network Working Group, Internet-Draft, draft-ieft-roll-minrank-hysteresis-of-03, May 2011, 11 pages.

Goyal, et al., "Reactive Discovery of Point-t0-Point Routes in Low Power and Lossy Networks" Internet Engineering Task Force, Internet Draft, draft-ietf-roll-p2p-rpt-03, May 13, 2011, 22 pages, Internet Engineering Task Force Trust.

Schießl, et al., "Notification of Transmittal of the International Search Report and the Written Opinion of the International Searching Authority, or the Declaration", Patent Cooperation Treaty, Jan. 3, 2013, 14 pages, PCT/US2012/043286, European Patent Office, Rijswijk, Netherlands.

Winter, et al., "RPL: IPv6 Routing Protocol for Low Power and Lossy Networks", draft-ietf-roll-rpl-19, IETF Internet-Draft; Mar. 2011, 164 pages.

Goya!, et al., "Reactive Discovery of Point-t0-Point Routes in Low Power and Lossy Networks" Internet Engineering Task Force, Internet Draft, draft-ietf-roll-p2p-rpt-03, May 13, 2011, 22 pages, Internet Engineering Task Force Trust.

"RPL:IPv6 Routing Protocol for Low Power and Lossy Networks" <draft-ietf-roll-rpl-19> by Winter, et al. (Mar. 13, 2011 version).

"Routing Metrics used for Path Calculation in Low Power and Lossy Networks" <draft-ietf-roll-routing-metrics-19> by Vasseur, et al., (Mar. 1, 2011 version).

"RPL Objective Function 0" <draft-ietf-roll-of0-11> by Thubert (Mar. 5, 2011 version).

"The Minimum Rank Objective Function with Hysteresis" <draft-ietf-roll-minrank-hysteresis-of-04> by O. Gnawali et al. (Mar. 3, 2011 version).

H. Luo et al., "Routing Correlated Data with Fusion Cost in Wireless Sensor Networks", Center for Research in Wireless Mobility and Networking (CreWMaN), Dept. of Computer Science and Engineering, The University of Texas at Arlington, Arlington, TX 76019, p. 1-34.

* cited by examiner

REDIRECTING TRAFFIC VIA TUNNELS TO DISCOVERED DATA AGGREGATORS

This application is a divisional application of U.S. application Ser. No. 13/164,708, filed Jun. 20, 2011, by Vasseur, et al., the contents of which are hereby incorporated by reference.

TECHNICAL FIELD

The present disclosure relates generally to computer networks, and, more particularly, to data aggregators in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Certain LLNs, such as advanced metering infrastructure (AMI) systems used to collect meter readings, as well as other data reporting networks, can be very large in scale. For example, a single collector/access point can serve thousands of meters while an AMI system with multiple collectors may service millions of meters. In addition, in a mesh field area network (FAN), congestion of packets carrying data (reporting/metered data) can be a significant issue, where data packets from/to a given meter may have to contend with multiple (at times hundreds) of packets from other meters over each radio mesh link. In addition, in many reporting networks, most if not all of the traffic is either Point-to-Multipoint (P2MP) or Multipoint-to-Point (MP2P). Consequently, links are getting more congested as they get closer to the "point", such as a collector (e.g., DAG root node) where the traffic tends to be concentrated.

Though reporting data may be generated (sensed/metered) at a frequent interval (e.g., every few minutes), to reduce congestion and provide a more scalable system, reporting data is currently stored at the originating reporting device, and transmitted at a less frequent rate (e.g., every eight hours). This less frequent rate, however, is random with respect to other meters, and may still jeopardize the efficiency of the network by causing collisions where the less frequent rate still overlaps reporting transmissions from other nodes in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
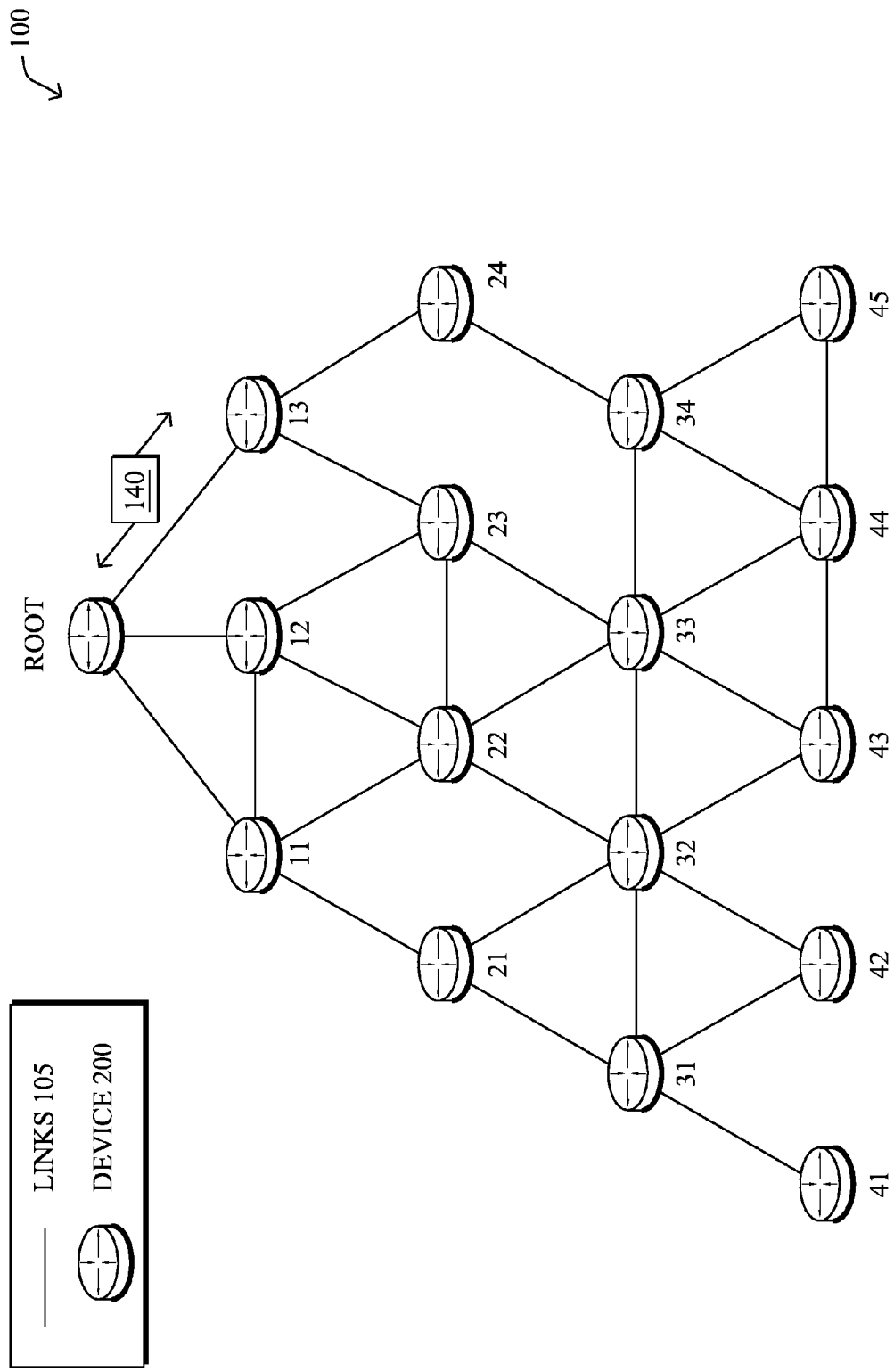
FIG. 1 illustrates an example computer network.

According to one or more embodiments of the disclosure, a data aggregator discovery (DAD) message may be distributed by an associated data aggregator in a directed acyclic graph (DAG), and received at a particular node of the DAG in a computer network. In particular, the DAD message identifies the initiating data aggregator, and comprises a recorded route taken from the data aggregator to the particular node as well as a total path cost for the particular node to reach a root node of the DAG through the recorded route and via the data aggregator. As such, the receiving particular node may determine a path cost increase (PCI) associated with use of the data aggregator based on the total path cost within DAD message as compared to a DAG-based path cost for the particular node to reach the root node via the DAG. In response to the PCI being below a configured threshold, the particular node may redirect traffic to the data aggregator as source-routed traffic according to the recorded route in the DAD message. The traffic may then be aggregated by the data aggregator, accordingly.

According to one or more additional embodiments of the disclosure, a location of one or more data aggregators in the DAG may be determined. Also, one or more reporting groups may be established based thereon, where the reporting groups are each associated with an exclusive time at which nodes of the reporting groups are configured to redirect traffic, each reporting group based locally on a corresponding data aggregator. Nodes may then be assigned to the reporting groups, and informed of their assignments, such that the nodes may then redirect traffic to a root node of the DAG via the corresponding data aggregator during the associated exclusive time of their assigned reporting group.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," ... "44," "45," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4 (or 15.4 g), WiFi, Bluetooth®, etc.) or other shared media protocols where appropriate (e.g., PLC). In this context, a protocol consists of a set of rules defining how the nodes interact with each other.

Figure 2:
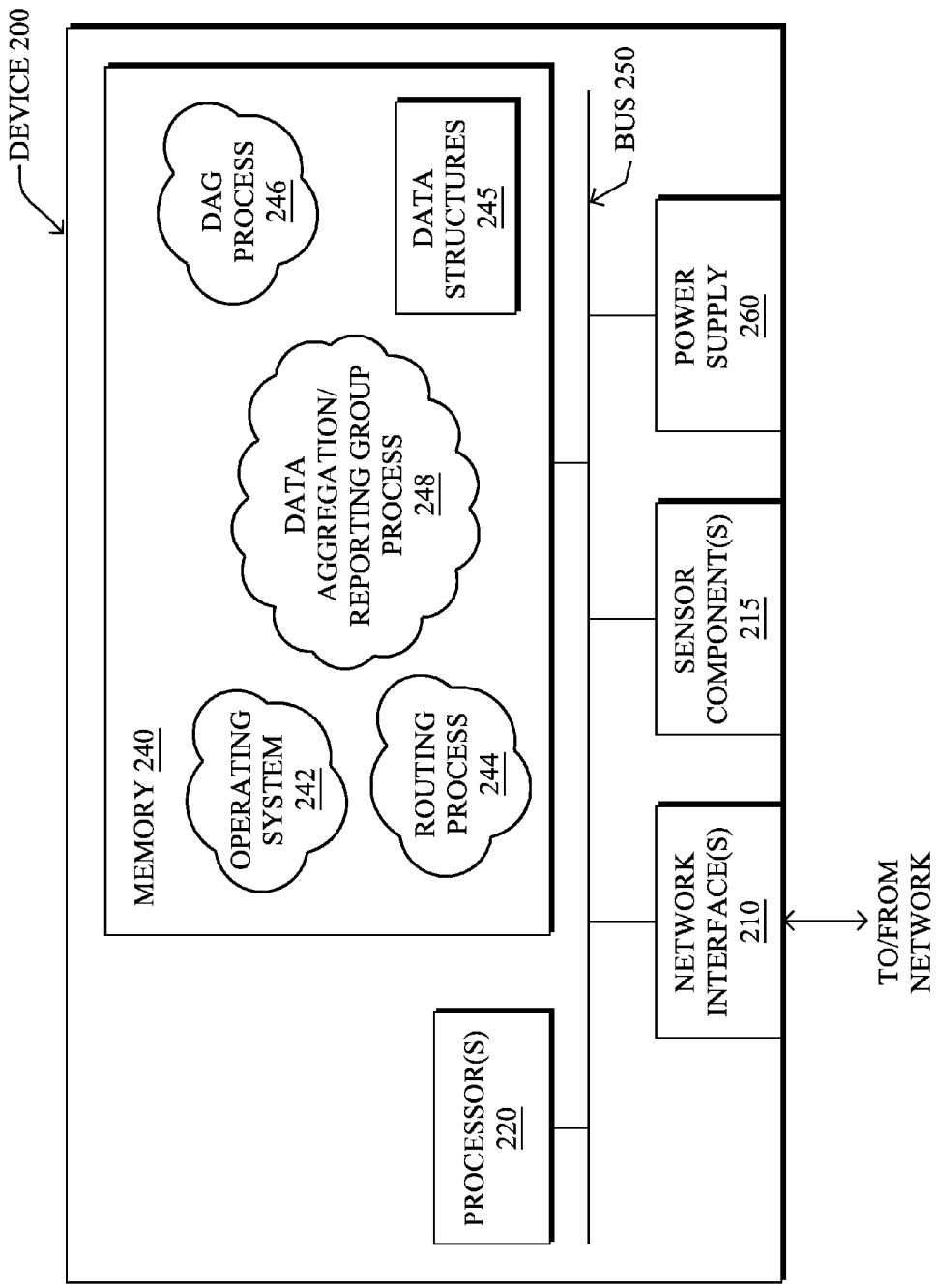
FIG. 2 illustrates an example network device/node.

FIG. 2 is a schematic block diagram of an example node/device 200 that may be used with one or more embodiments described herein, e.g., as a root node, data aggregator, or any other node in the network 100. The device may comprise one or more network interfaces 210 (e.g., wireless), one or more sensor components 215 (for sensor devices), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly, via PLC, etc.). The network interfaces may be configured to transmit and/or receive data using a variety of different communication protocols, particularly depending upon the underlying transmission medium (e.g., wireless, PLC, wired, etc.). Note, further, that a node may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. For instance, these software processes and/or services may comprise routing process/services 244, which may include a directed acyclic graph (DAG) process 246 in certain embodiments, and also an illustrative data aggregation/reporting group process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-11> by Thubert (May 5, 2011 version) and "The Minimum Rank Objective Function with Hysteresis"<draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
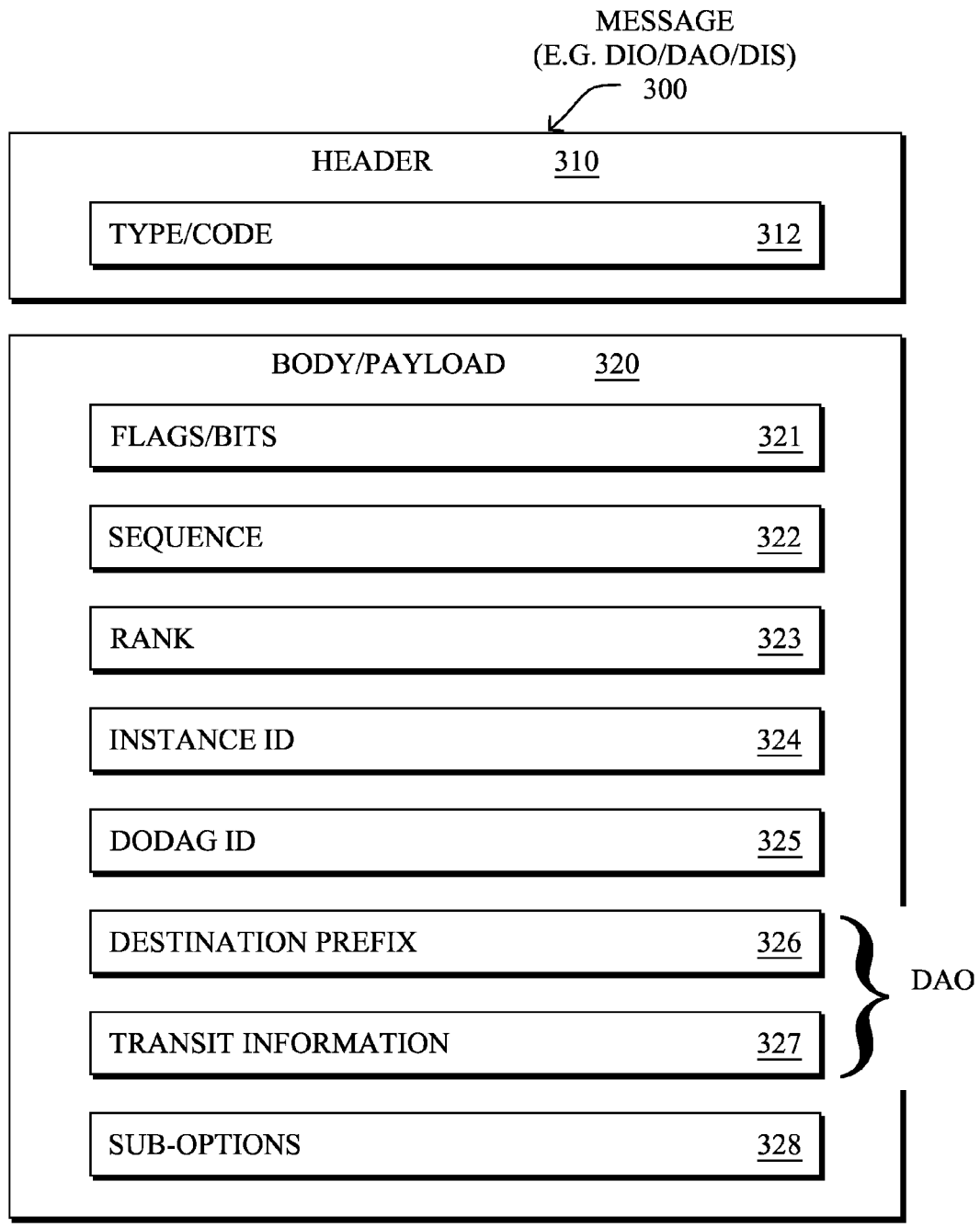
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
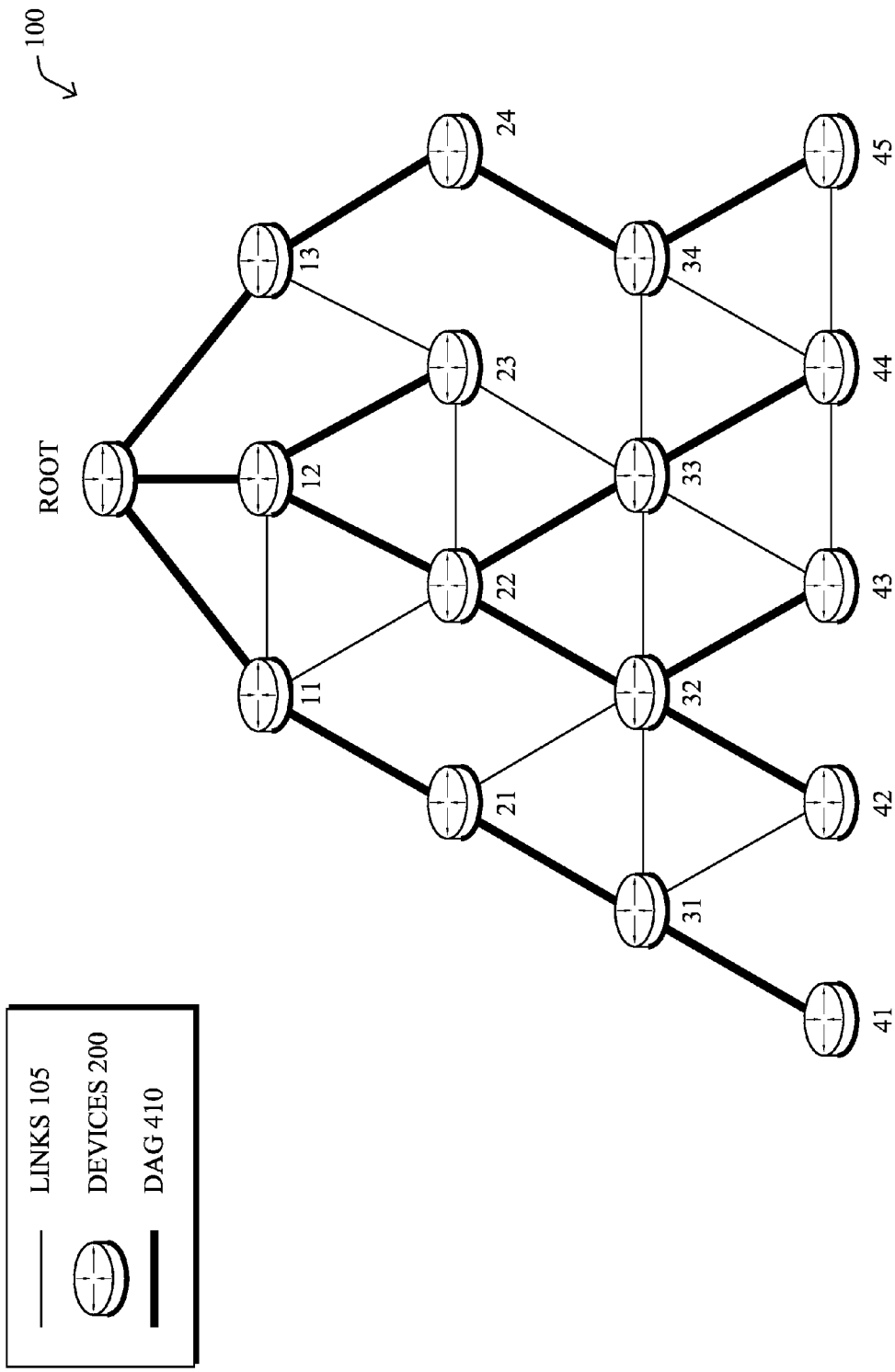
FIG. 4 illustrates an example directed acyclic graph (DAG) in the computer network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, certain LLNs, such as advanced metering infrastructure (AMI) systems used to collect meter readings, as well as other data reporting networks, can be very large in scale. For example, a single collector/access point can serve thousands of meters while an AMI system with multiple collectors may service millions of meters. In addition, in a mesh field area network (FAN), congestion of packets carrying data (reporting/metered data) can be a significant issue, where data packets from/to a given meter may have to contend with multiple (at times hundreds) of packets from other meters over each radio mesh link. In addition, in many reporting networks, most if not all of the traffic is either Point-to-Multipoint (P2MP) or Multipoint-to-Point (MP2P). Consequently, links are getting more congested as they get closer to the "point", such as a collector (e.g., DAG root node) where the traffic tends to be concentrated.

Moreover, though reporting data may be generated (sensed/metered) at a frequent interval (e.g., every few minutes), to reduce congestion and provide a more scalable system, reporting data is currently stored at the originating reporting device, and transmitted at a less frequent rate (e.g., every eight hours). This less frequent rate, however, is random with respect to other meters, and may still jeopardize the efficiency of the network by causing collisions. That is, the less frequent rate may still allow reporting transmissions from other nodes in the network to overlap, and hence collide.

RPL supports the capability for a node to advertise in the DIO messages 300 (in a DAG metric container) the node's capability to act as a data aggregator. Thus nodes can potentially perform parent selection according to that information and, when appropriate, select a longer path to send their traffic along a path that traverses a data aggregator. In particular, information that meters send upstream often fall into two categories: messages that can be summarized/aggregated and those which cannot. For example, outage messages fall into the first category since meter power reading are more difficult to aggregate. (It should be noted that even when the data itself cannot be aggregated, simply by combining a few messages into a single longer message can reduce the header overhead.) On the other hand, there are many applications where data aggregation can be performed, especially when meters are used as sensors and correlation between measured data is used so as to determine whether or not an outage took place in the electric grid.

Unfortunately, there are a number of situations where discovery of such data aggregators is neither efficient nor effective. For example, this may be particularly noticed when a parent applies a different policy (e.g., because it does not give a higher preference to parents offering a path to the root that traverses a data aggregator), or simply because the data aggregator cannot be seen.

Figure 5:
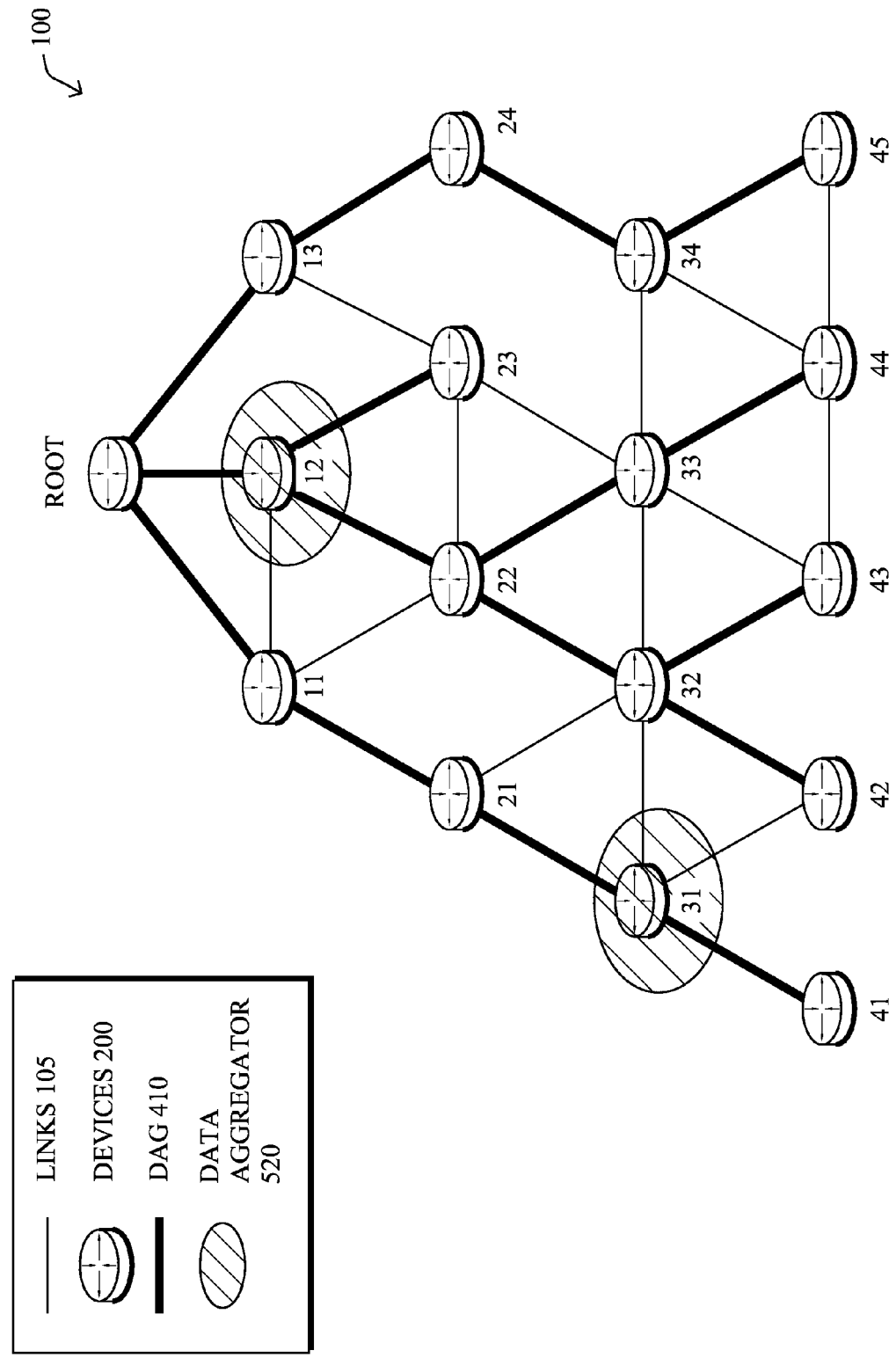
FIG. 5 illustrates an example arrangement of data aggregators in the DAG.

For instance, FIG. 5 illustrates an example placement of various data aggregators 520, such as nodes 31 and node 12. Generally, aggregators may be selectively placed in the network 100, and are equipped with sufficient memory to handle the aggregation tasks. As shown in FIG. 5, though node 31 is configured as a data aggregator, node 22 would not "see" that node 31 is an aggregator since node 31 is "deeper" in the DAG 410, and, more particularly, not along a shared path to the root node of the DAG.

Redirecting Traffic Via Discovered Data Aggregators

The techniques herein provide efficient traffic redirection in the presence of dynamically discovered data aggregators. In particular, a system in accordance with the embodiments herein provides an efficient method for collecting data in LLNs by taking into account the physical topology and the ability of some nodes of the network to detect the presence of data aggregators (that they could not detect with existing techniques), and to redirect their traffic along a "detour" thanks to packet tunneling, thus reducing the volume of traffic in the network, increasing its life duration (when battery operated), and decreasing the level of congestion in the network. Generally, in one or more of the embodiments described herein, data aggregators advertise themselves by flooding a message through the network, and nodes maintain source-routes to interesting aggregators. In forwarding traffic, a node may choose to utilize the data aggregator if the added overhead of a longer path seems justified, or else may forward the traffic directly to the root node (or other collector) using the DAG topology.

Specifically, according to one or more embodiments of the disclosure as described in greater detail below, a data aggregator discovery (DAD) message may be distributed by an associated data aggregator in a DAG, and received at a particular node of the DAG. In particular, the DAD message identifies the initiating data aggregator, and comprises a recorded route taken from the data aggregator to the particular node as well as a total path cost for the particular node to reach a root node of the DAG through the recorded route and via the data aggregator. As such, the receiving particular node may determine a path cost increase (PCI) associated with use of the data aggregator based on the total path cost within DAD message as compared to a DAG-based path cost for the particular node to reach the root node via the DAG. In response to the PCI being below a configured threshold, the particular node may redirect traffic to the data aggregator as source-routed traffic according to the recorded route in the DAD message. The traffic may then be aggregated by the data aggregator, accordingly. Other features, aspects, and embodiments of the disclosure are discussed below.

Illustratively, the techniques described herein may be performed by hardware, software, and/or firmware, such as in accordance with the illustrative data aggregation process 248, which may contain computer executable instructions executed by processor 220 to perform functions relating to the novel techniques described herein, e.g., in conjunction with routing process 244 and/or DAG process 246. In particular, the process 248 may be configured depending upon the functionality of the device on which it is operating (e.g., as a data aggregator itself, or as a node redirecting traffic to a data aggregator). Note that the techniques herein may be treated as extensions to conventional protocols, such as the RPL protocol, and as such, would be processed by similar components understood in the art that execute the RPL protocol, accordingly.

Operationally, data aggregators 520 in the network are configured to announce/advertise themselves using a newly defined message called the Data Aggregator Discovery (DAD) message. DAD messages can be sent upon the expiration of a timer, when a specific event occurs (for example when a data aggregator detects that the network gets congested), or upon specific request. The DAD message is distributed (e.g., broadcasted or multicasted) in the network, and as they travel across the network (without following the DAG 410), routes are recorded along with path costs.

Figure 6:
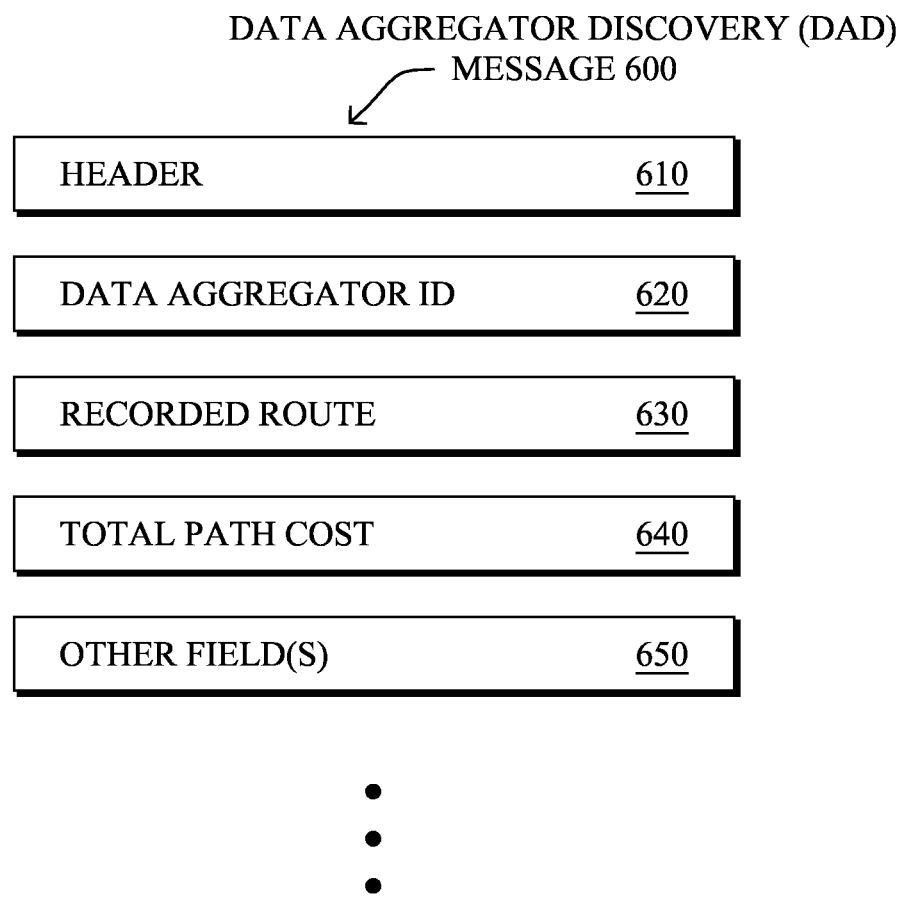
FIG. 6 illustrates an example data aggregator discovery (DAD) message.

FIG. 6 illustrates an example format that may be used for a DAD message 600. In particular, a data aggregator 520 (e.g., node 31) may generate a DAD message 600 that comprises a header 610, an identification 620 of the data aggregator, a recorded route field 630, as well as a total path cost field 640 and other optional fields 650. These DAD messages are propagated into the computer network away from the data aggregator by receiving nodes which correspondingly update the recorded route 630, as well as the total path cost 640 for a subsequent receiving node to reach the root node through the updated recorded route and via the data aggregator.

Figure 7:
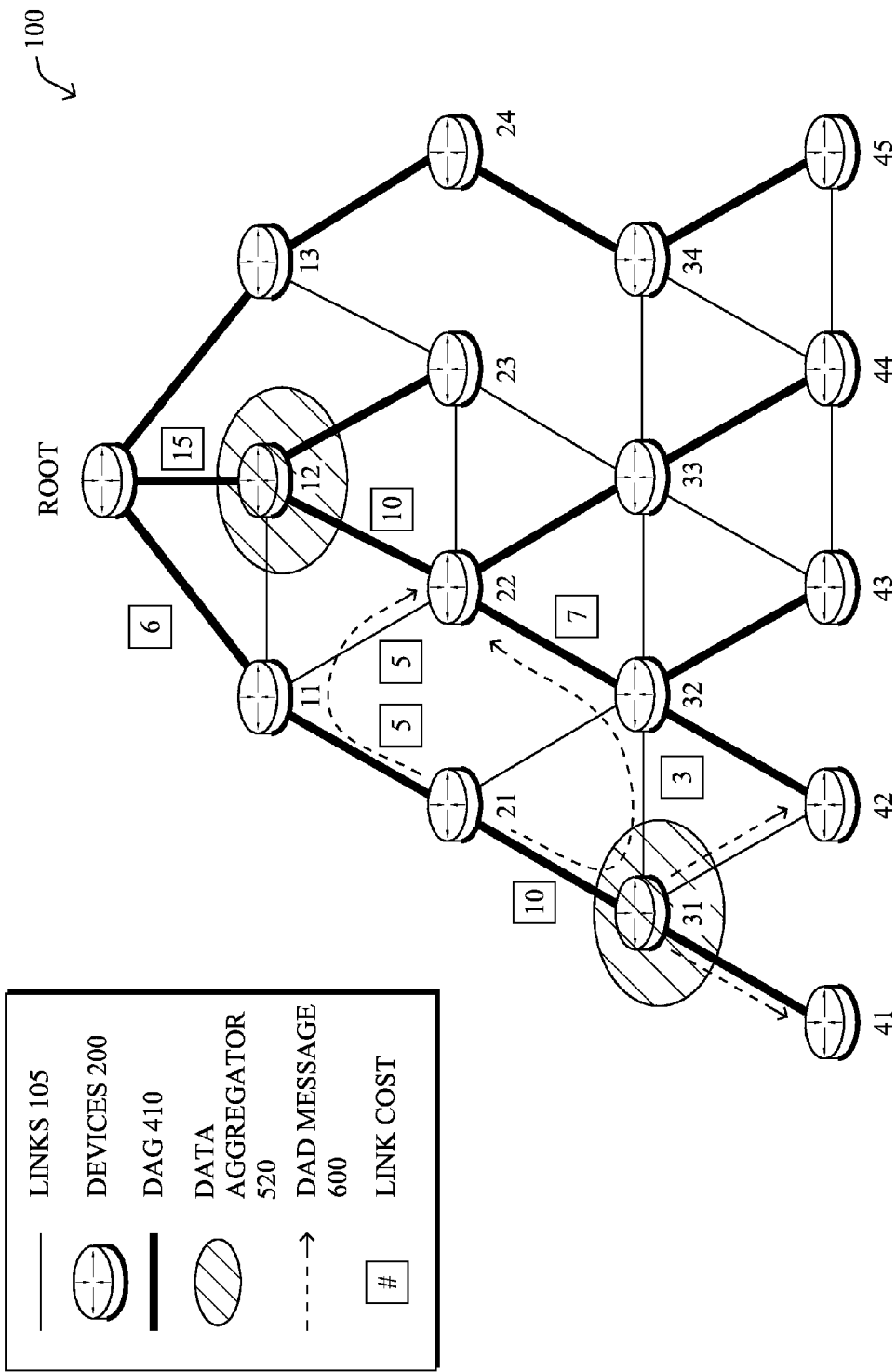
FIG. 7 illustrates distribution of the DAD message in the computer network.

Specifically, the recorded route field may be populated during propagation of the message 600 through the network, and records the route taken from the data aggregator to corresponding receiving nodes along the way. For example, as shown in FIG. 7, the DAD may be distributed/flooded into the network, such that by the time node 22 receives the correspondingly distributed DAD message, the recorded route 630 will be 31-32(-22). The total path cost field 640 may also be updated along the way, which is the cost for the corresponding receiving node to reach the root node (or other collector/management node) through the recorded route and via the data aggregator. For example, based on the illustrative costs shown in FIG. 7, the cost for the data aggregator to reach the root node along the DAG 410 (path 31-21-11-root) is 10+5+6=21, and the cost of the recorded route 31-32-22 is 3+7=10, thus the total cost 640 is 21+10=31.

Note that the updated total path cost 640 may comprises the cost up to the transmitting node (e.g., up to node 32, not including the link to node 22) where the path cost between the final two nodes (node 32 and node 22) is only known by the receiving node, which is particularly the case where DAD messages 600 are broadcast (and, hence, the transmitting node doesn't explicitly include the cost to any particular node). Note also that in an alternative embodiment, the updated cost to reach the data aggregator along the recorded route (e.g., 10) may be stored in a field separate from the unchanging cost (within the DAD message, that is) of the data aggregator reaching the root node (e.g., 21).

Upon receiving a DAD message 600, a node (e.g., node 22) can then store the received information, should it decide to redirect some traffic eligible for aggregation along a non-DAG path. The stored information, e.g., in data structures 245, generally comprises of the following entries:

1) Address/identification of the discovered data aggregator;
2) Path cost increase (PCI) associated with use of the data aggregator, determined based on the total path cost within DAD message 640 (e.g., plus the "last hop" cost, if necessary) as compared to a DAG-based path cost for the particular node to reach the root node via the DAG 410 (note that in very specific cases, the PCI may be negative, i.e., a lower-cost path); and
3) Source route to the data aggregator (as recorded by the DAD message).

Referring again to the example above, node 22 stores the identification (ID) or address of node 31 as the data aggregator, and the recorded route (31-32-22) to reach it, accordingly. The PCI is based on the total path cost "31" noted above, less the DAG path cost for node 22 to reach the root via the DAG 410, e.g., a cost of 10+15=25 (via path 22-12-root). The PCI, then, is the total path cost via the aggregator (cost 31) less the DAG-based path cost (cost 25), which in this example, PCI=6.

Figure 8:
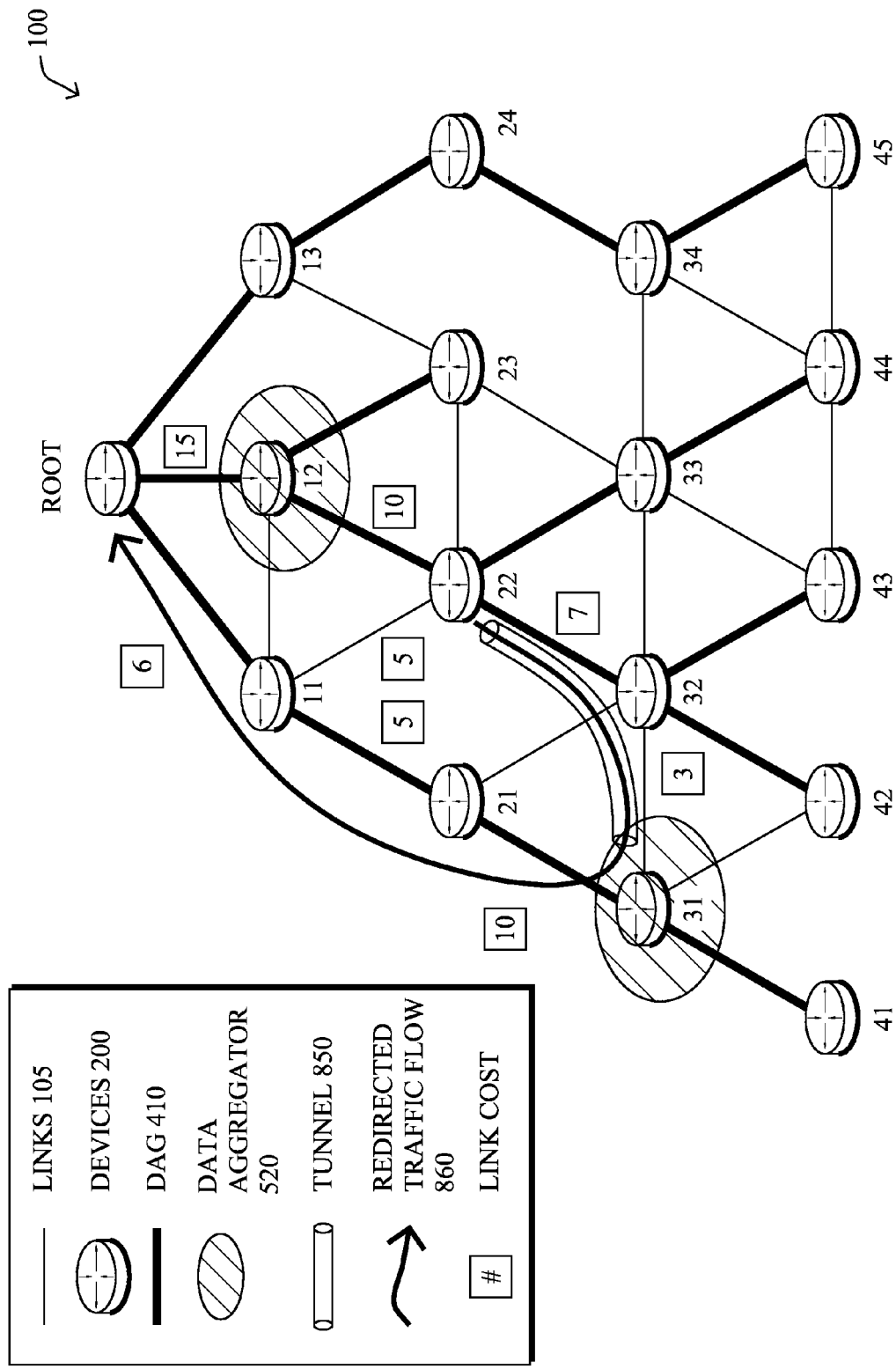
FIG. 8 illustrates an example of redirected traffic via a data aggregator.

When a node (e.g., node 22) decides that it is appropriate to redirect some traffic along a path traversing an aggregator and the PCI is below some pre-determined threshold, the node redirects the traffic (e.g., packet 140) along the path to the selected data aggregator. For instance, as shown in FIG. 8, a tunnel 850 may be created through source-routing the redirected traffic, where an outer packet header contains the destination address of the data aggregator (e.g., node 31) and the source route of the packet is the route stored for that aggregator (i.e., according to the recorded route in the DAD message). That is, the redirecting node (node 22) inserts into the traffic 860 (e.g., packet) an explicitly indicated path to be followed, such that nodes (e.g., node 32) simply pass the source-routed packet through the network according to the indicated path.

The remainder of the traffic flow is also illustrated in FIG. 8, where, once the traffic is tunneled from node 22 to node 31 along the route 22-32-31, the packet is decapsulated to follow the DAG path from the data aggregator towards the DAG root. That is, the selected data aggregator receives redirected traffic from one or more nodes, aggregates the redirected traffic, and then forwards the aggregated traffic along its DAG path to the root node. Note that the packet is first tunneled (source-routed) to the aggregator, and then may be routed hop-by-hop or also tunneled (source-routed) along the DAG to the DAG root. Note also that while the data aggregator may perform data aggregation (e.g., changing and/or combining data) to form a new set of aggregated messages to forward to the DAG root, the data aggregator may alternatively be configured to simply forward the received traffic as-is (decapsulated) to the DAG root.

There are a number of reasons to trigger redirection of traffic to aggregators using source-routing tunnels (or, notably, other suitable types of tunnels 850). For example, a node may identify that a received packet contains information that can be easily aggregated (e.g., by inspecting the packet, such as based on a flag set in the packet header or other explicitly carried indication that it is to be aggregated, etc.). Other reasons for selecting particular traffic to redirect (or for redirecting all traffic) may be based on a specific type or class of traffic (e.g., priority, substance, etc.), and so on. In other circumstances, the node may experience a particular event, such as experiencing local traffic congestion (congestion of a DAG path to the root node), a sudden increase in the DAG path cost (e.g., an indicator of congestion), or it may receive a back pressure message from its preferred parent or other explicit command. Note that in one embodiment, the reasons (select traffic, events, etc.) for which a node redirects traffic may be defined by the objective function (OF) for the DAG.

Note that a node may have different thresholds for the PCI based on a particular reason for redirecting traffic. For instance, a node may determine the threshold of acceptability in increasing the path cost. For example, it may be acceptable to increase the path cost by 10 units (or some percentage) in steady state operation, and to increase the path cost by 20 units if a severe congestion is detected or a back pressure message is received from a preferred parent. Other reasons (e.g., type/class, congestion, explicit requests, etc.) may each be associated with a different configured threshold, and such thresholds may be originally configured by a system administrator and distributed to the nodes in the network, e.g., via DIO messages 300.

Moreover, it should be noted that a node may receive a plurality of DAD messages 600. In one case, a node may receive multiple DAD messages for a same data aggregator, and would in this case store the information related to the most optimal path. For example, with reference again to FIG. 7 above, node 22 may also receive a DAD message via node 11, i.e., with the recorded route 31-21-11-22 and with a total path cost=41 (or 20, when the DAG path cost for the aggregator is kept separately). In another case, a node could store information related to a set of different aggregators, and the node may then determine which one or the aggregators to used based on the corresponding DAD messages (e.g., a best cost, or other capabilities, such as types of aggregation performed, which may be carried in "other field" 650). The node may decide to store only the preferred detour to the closest aggregator, or else a list of aggregators for load-balancing the redirected traffic, or for backup aggregators should a preferred aggregator fail, etc.

In addition to the embodiments described above, the techniques herein may also adaptively modify the timing at which packet transmission from various reporting nodes is initiated through the use of "reporting groups". In particular, reporting groups provide a data reporting (e.g., meter data collection) methodology that takes into account the topology of a mesh network. In particular, as described herein, the techniques increase the reliability of packet delivery and increase the overall network efficiency by decreasing the collision probability as well as the number of reporting data messages that a system can collect within a given period.

Specifically, according to one or more embodiments of the disclosure, a node (e.g., root node) may determine a topology of a plurality of reporting nodes (e.g., sensors/meters) within a DAG 410, as shown in FIG. 4, in a computer network. The reporting nodes may then be assigned to one of a plurality of reporting groups, in particular, based on the location of data aggregators as described below, where reporting nodes are allowed to report only during designated time windows corresponding to their assigned reporting group. The reporting nodes may then be informed of at least their own assignment to a particular reporting group.

Notably, the number of reporting groups N, may be chosen by a network administrator and/or based dynamically in response to network conditions. For example, if the network 100 is relatively cooperative (i.e., few collisions, little interference, etc.) as determined by various network statistic monitoring techniques (e.g., monitoring packet loss, etc.), then the number N of reporting groups may be kept low or even decreased. Alternatively, at the other extreme where the reporting nodes are particularly contentious (i.e., many collisions, much interference, etc.), then the number of reporting groups may be increased.

The process of assigning nodes to the various groups may be governed by, but are not limited to being governed by, the following considerations:

1.) Reporting nodes are grouped so that the traffic generated by the nodes in a given group will have the least (minimal) contention with each other when reporting. For instance, this measure can be determined by estimating the amount of contention these nodes would have as their packets propagate uplink toward the DAG root (e.g. collector, cell relay, FAN router, etc.), or, more particularly, to an associated data aggregator. The number of potential collisions can be estimated based on the meter location, channel, power, and neighbor relationships collected at the DAG root (or at the head-end node). Moreover, any other metrics such as ETX may be used.
2.) Nodes in adjacent reporting groups (e.g., Group "i", "i−1", and "i+1"), specifically, groups adjacent in terms of timing windows, are also generally chosen to minimize contention/collision/interference. In other words, reporting nodes may be assigned to a particular group such that there is minimal contention with reporting nodes within adjacent reporting groups in addition to other reporting nodes within the particular reporting group.
3.) Uplink propagation path diversity is preferably maximized between reporting nodes of a particular reporting group.

Using these considerations, the root node (or other management node) may assess neighbor relationships within the network and may create reporting groups in order to avoid any conflict/overlap in transmissions taking into account the DAG topology. Note that the reporting groups attempt to not only prevent collisions from direct neighbors (e.g., reporting nodes 43 and 44), but also hidden neighbors (e.g., nodes 31 and 33).

According to the additional embodiments of the disclosure herein, the reporting groups are specifically based on the existence (and location) of data aggregators in the network, as well as the underlying network topology, in order to synchronize the sending of data to the aggregators. In particular, as described below, data aggregators are informed of the reporting groups below it, e.g., along with the number of members of each reporting group, so as to buffer the received data for a period of time computed according to each timeslot of the reporting group in order to maximize the degree of data aggregation.

Specifically, according to one or more additional embodiments of the disclosure, as described in greater detail below, a location of one or more data aggregators in the DAG may be determined. Also, one or more reporting groups may be established based thereon, where the reporting groups are each associated with an exclusive time at which nodes of the reporting groups are configured to redirect traffic, each reporting group based locally on a corresponding data aggregator. Nodes may then be assigned to the reporting groups, and informed of their assignments, such that the nodes may then redirect traffic to a root node of the DAG via the corresponding data aggregator during the associated exclusive time of their assigned reporting group.

Illustratively, this portion of the techniques described herein may be performed by hardware, software, and/or firmware, such as in accordance with the illustrative data aggregation/reporting group process 248, which may contain computer executable instructions executed by processor 220 to perform functions relating to the novel techniques described herein, e.g., again in conjunction with routing process 244 and/or DAG process 246. In particular, the process 248 may be configured depending upon the functionality of the device on which it is operating (e.g., as a data aggregator to wait for the reporting groups, as a node redirecting traffic to a data aggregator during its configured time for its reporting group, or as a root node/head-end application configured to establish the reporting groups). Note again that the techniques herein may be treated as extensions to conventional protocols, such as the RPL protocol, and as such, would be processed by similar components understood in the art that execute the RPL protocol, accordingly. Also, while certain techniques herein generally indicate that the root node of a DAG perform certain techniques herein, other management devices or head-end applications (e.g., network management services or "NMS" servers, etc.) may also make use of the techniques herein, accordingly.

The core of this aspect of the disclosure consists of assigning nodes to reporting groups according to the network topology and the existence of aggregators in the network discovered with the techniques above in order to reduce the volume of data. The first component of this aspect consists of discovering the capability of the nodes in the network to perform data aggregation. In one example, the DAO message 300 may carry a TLV (e.g., sub-options field 328) carrying node attributes to indicate data aggregator candidates, which may then be combined with the network topology in order to rebuild the DAG topology and the placement of the data aggregators. Other techniques for determining a location of one or more data aggregators in a DAG may be utilized, and those mentioned herein are merely examples. Note that once the aggregators are configured, they may distribute their DAD messages 600 as described above so other surrounding nodes may discover them, accordingly.

The second component of the disclosure consists of determining how to allocate nodes to reporting groups according to the existence of data aggregators along the DAG. In particular, the root node or other head-end application establishes one or more reporting groups based on the location of the one or more data aggregators in the DAG, where, as described above, the reporting groups each associated with an exclusive time at which nodes of the reporting groups are configured to redirect traffic. Generally, each reporting group is based locally on a corresponding data aggregator such that nodes using a particular data aggregator may be assigned to a shared routing group.

Figure 9:
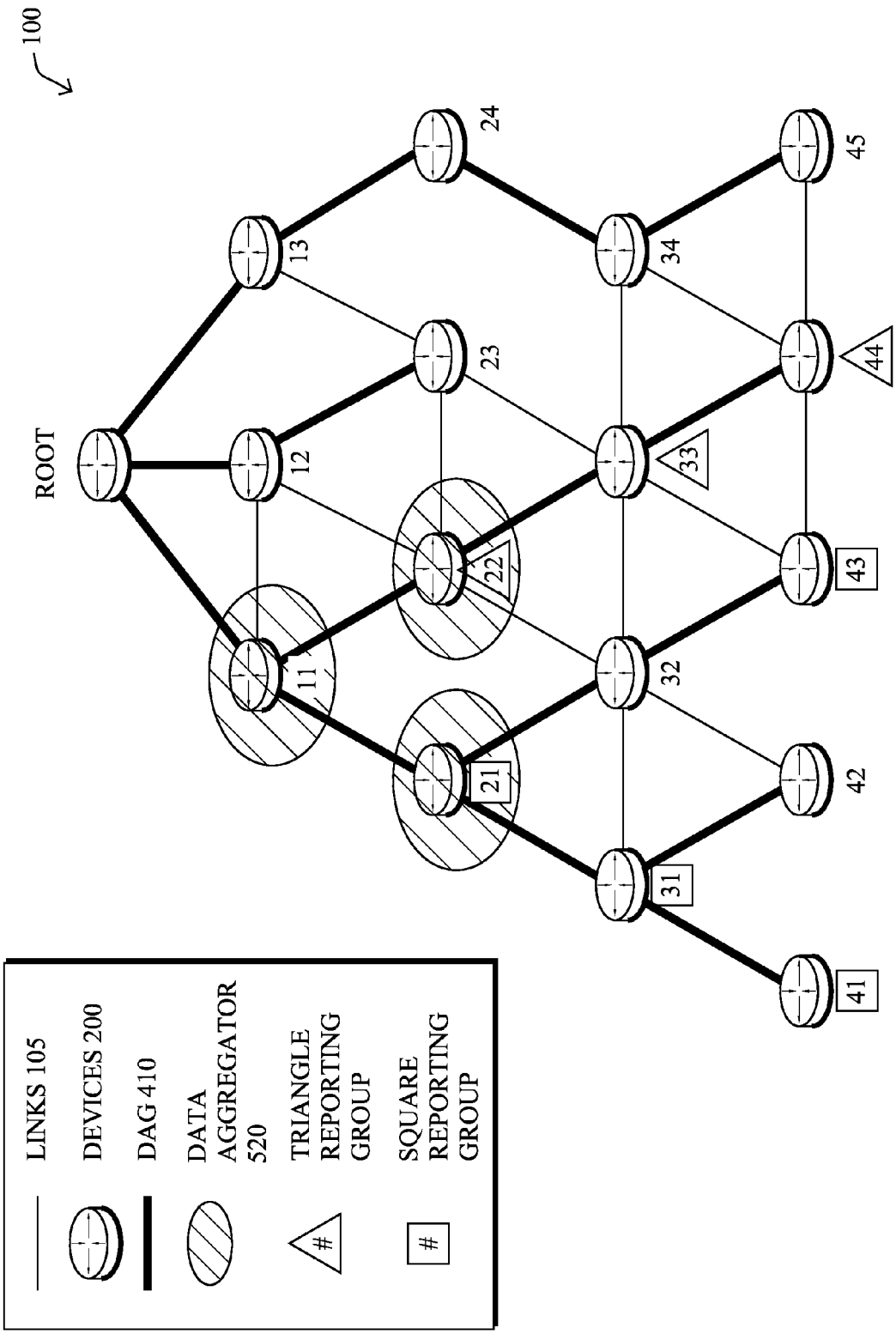
FIG. 9 illustrates an example of reporting groups based on data aggregator location in the computer network.

For the sake of illustration, FIG. 9 illustrates a different arrangement of data aggregators than FIG. 5 above, where now nodes 11, 21, and 22 are all data aggregators (the change made for ease of discussion). With current systems, in the absence of synchronization, the level of aggregation is likely to be very sub-optimal, if at all efficient. With the techniques herein, upon discovering the network topology and the location of data aggregators, the DAG root might assign the reporting groups as follows:

square reporting group: 21, 31, 41, and 43; and
triangle reporting group: 22, 33, and 44.

(Only a small number of nodes are shown here for the sake of illustration). After notifying (informing) the nodes of their reporting group membership, the DAG root sends a message to the data aggregators consisting of providing the time slot of the reporting group for their children along with the number of children for each reporting groups. Accordingly, each particular data aggregators may learn of one or more reporting groups configured to redirect traffic through that particular data aggregator. Note that since network topologies (DAG shape) do change as links and nodes fail, link/node metrics get updated, etc., reporting group assignments may correspondingly be reevaluated, e.g., each time a DAG topology change leads to decreasing the level of aggregation above a pre-defined threshold.

Referring again to the example in FIG. 9, the nodes 31, 41 and 43 belonging to the square reporting group would send their data toward their selected data aggregator (e.g. node 21), which may be along the DAG to the root, or, as described in detail above, may be via a source-routed tunnel 850 as redirected traffic 860. This data would then be received by the aggregator, and once the three metered samples for all children have been received (three in this example), the node 21 would aggregate the data (and potentially wait for other reporting groups if any were to report to it), thus capturing all data. The data aggregator node 22 would perform the same aggregation according to its timeslot for the triangle reporting group.

The behavior of node 11 is next observed. Since node 11 has been informed that it was being used by (on the path for) two reporting groups (triangle and square) along with their timeslot, node 11 would have to wait for the expiration of the longest timeslot for each of the reporting groups below it, before performing any aggregation. In other words, certain particular data aggregators may corresponds to a plurality of reporting groups, and as such, are configured to allow each of the plurality of reporting groups to send/redirect traffic at least once prior to aggregating the redirected traffic. This would substantially increase the chance to perform data aggregation as compared with current non-synchronized systems. It should be noted, also, that allowing the DAG root to notify data aggregators of their child reporting group (and corresponding timing) is by itself useful even if the reporting groups are assigned to nodes without taking into account the presence (and location) of data aggregators.

Figure 10:
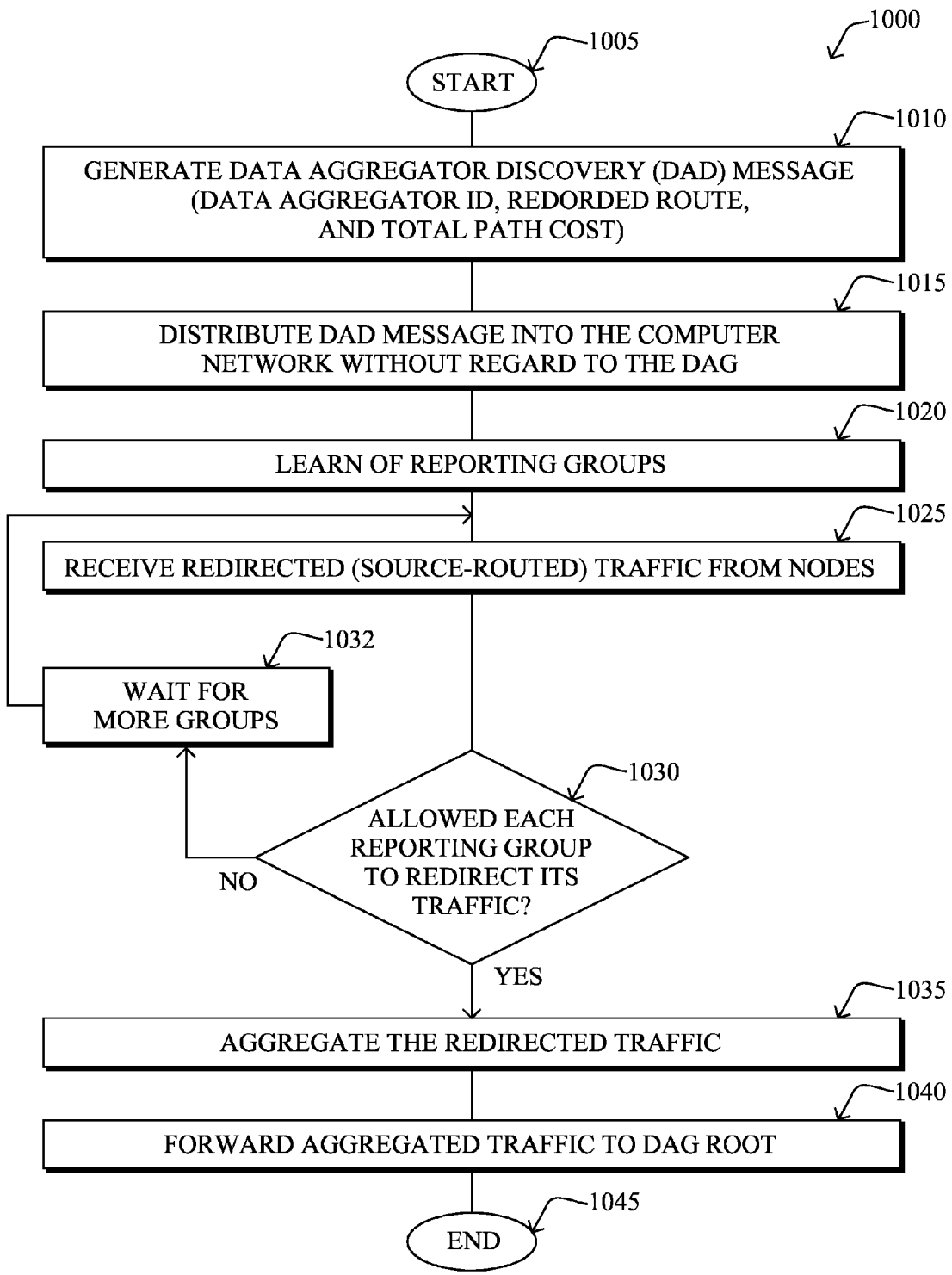
FIG. 10 illustrates an example simplified procedure for providing efficient traffic redirection in the presence of dynamically discovered data aggregators, particularly from the perspective of the data aggregators.

FIG. 10 illustrates an example simplified procedure for providing efficient traffic redirection in the presence of dynamically discovered data aggregators in accordance with one or more embodiments described herein, particularly from the perspective of the data aggregators. The procedure 1000 starts at step 1005, and continues to step 1010, where, as described in detail above, a data aggregator (e.g., node 31) generates a DAD message 600 having a data aggregator ID 620, recorded route field 630, and total path cost field 640, the latter two of which being updated during propagation of the message. In step 1015, the DAD message is distributed (e.g., broadcast) into the computer network 100 without regard to the topology of the DAG 410. Notably, as described above, in step 1020 the data aggregator may also learn of one or more reporting groups that may utilize the aggregator.

In step 1025, the data aggregator may receive redirected (source-routed) traffic from nodes, and in certain embodiments, after waiting to have allowed each reporting group to redirect its traffic in step 1030 as detailed above (i.e., waiting in step 1032 to receive additional redirected traffic from nodes of additional reporting groups in step 1025), the data aggregator may aggregate the redirected traffic in step 1035, accordingly. This aggregated traffic may then be forwarded to the DAG root in step 1040, and the procedure 1000 ends in step 1045, notably with the option to re-generate and distributed new DAD messages (e.g., based on cost updates, etc.), learn of new reporting groups, receive additional redirected traffic, etc.

Figure 11:
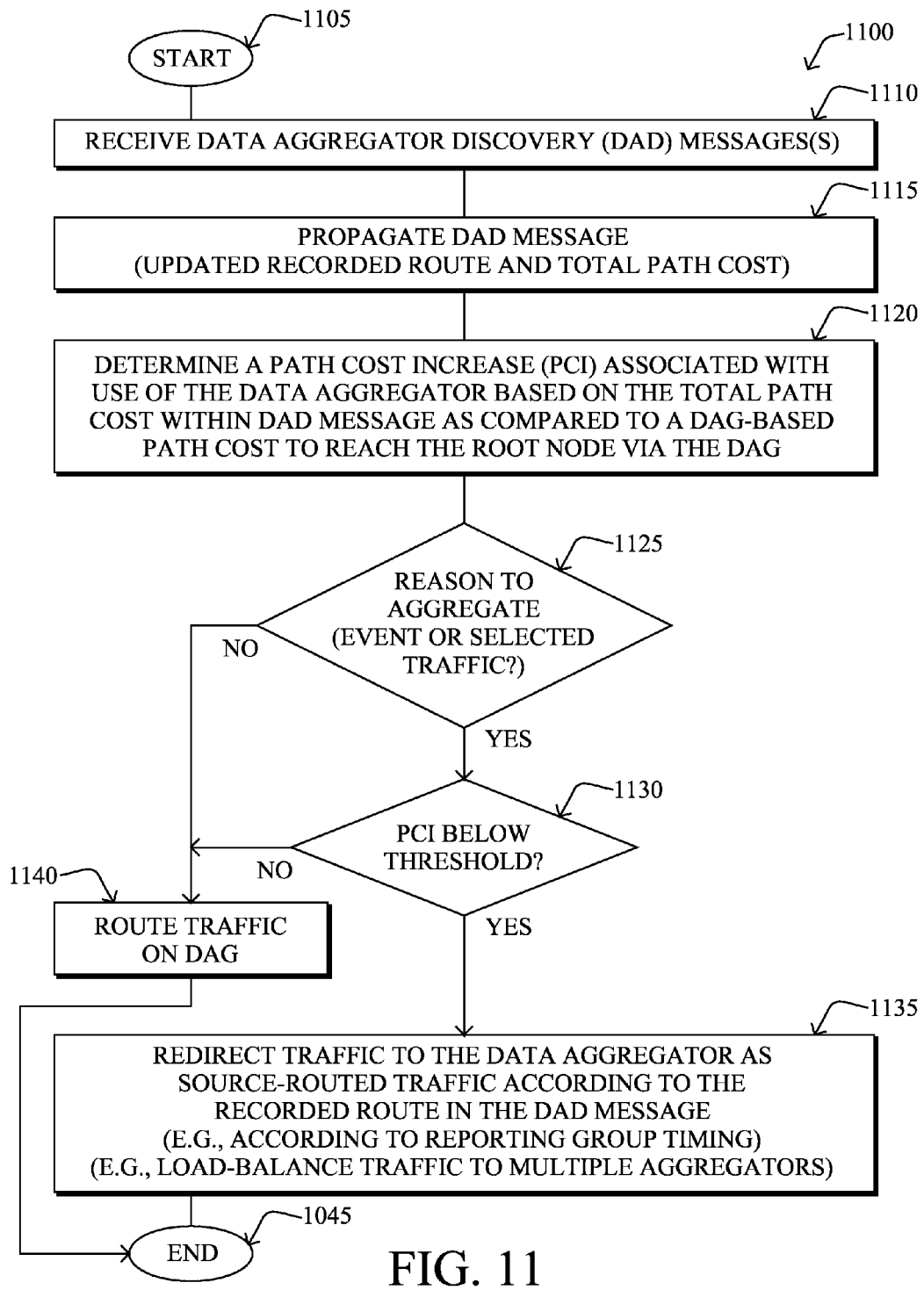
FIG. 11 illustrates another example simplified procedure for providing efficient traffic redirection in the presence of dynamically discovered data aggregators, particularly from the perspective of the redirecting nodes.

In addition, FIG. 11 illustrates another example simplified procedure for providing efficient traffic redirection in the presence of dynamically discovered data aggregators in accordance with one or more embodiments described herein, particularly from the perspective of the redirecting nodes. The procedure 1100 starts at step 1105, and continues to step 1110, where, as described in detail above, a particular node (e.g., node 22) receives one or more DAD messages 600. Notably, in response in step 1115, the particular node may propagate the DAD message with an updated recorded route and total path cost, as mentioned above.

In step 1120, the receiving particular node determines the path cost increase (PCI) associated with use of the data aggregator identified in the DAD message (e.g., node 31) based on a total path cost 640 within DAD message as compared to a DAG-based path cost to reach the root node via the DAG 410. In response to there being a reason to aggregate data in step 1125, such as a particular configuration, event, select traffic, etc., (as detailed above), and in response to the PCI being below a configured threshold in step 1130 (e.g., adjusted in response to the particular reason in step 1125), then in step 1135 the particular node redirects the corresponding traffic to the data aggregator as source-routed traffic according to the recorded route 630 in the DAD message 600. Note that as described above, the particular node may be configured to redirect the traffic according to reporting group timing. Note also that the particular node may load-balance the traffic to multiple aggregators, as also mentioned above. The receiving data aggregator(s) may then aggregate and forward the traffic toward the DAG root as described above with reference to FIG. 10.

If there is no reason to aggregate data/traffic in step 1125, or if there is a reason, but the added PCI is too great to justify the use of a particular data aggregator, then in step 1140 the traffic may be simply routed by the particular node on the DAG 410. The procedure 1100 ends in step 1145, notably with the option to receive further DAD messages, compute updated PCIs (e.g., based on local path cost updates), redirect data, etc.

Figure 12:
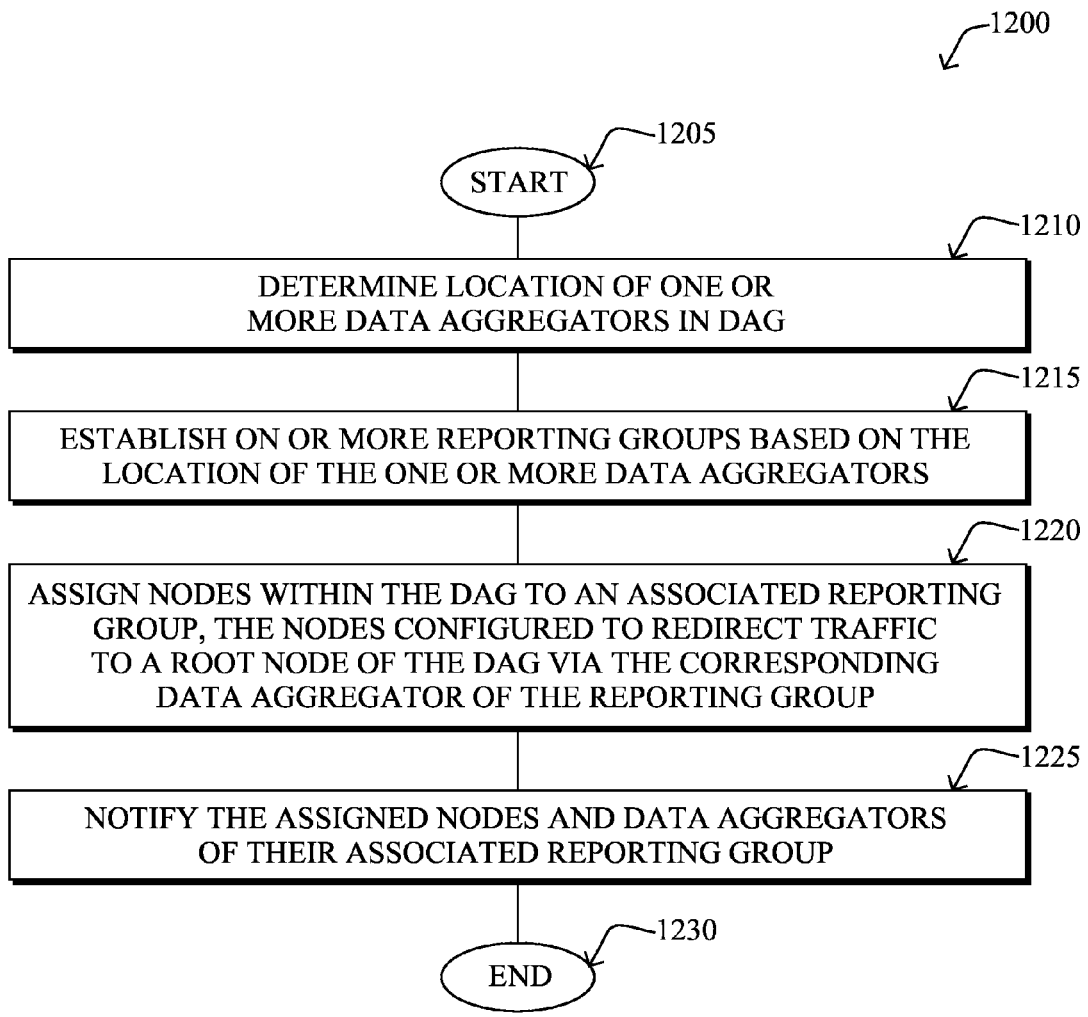
FIG. 12 illustrates an example simplified procedure for establishing reporting groups based on the presence (and location) of data aggregators in the computer network, particularly from the perspective of the root-node/head-end application.

Lastly, FIG. 12 illustrates an example simplified procedure for establishing reporting groups based on the presence (and location) of data aggregators in the computer network in accordance with one or more embodiments described herein, particularly from the perspective of the root node/head-end application. The procedure 1200 starts at step 1205, and continues to step 1210, where, as described in detail above, the location of one or more data aggregators in the DAG is determined, based on various available techniques. Thereafter, in step 1215, one or more reporting groups may be established based on the location of the one or more data aggregators, and nodes may be correspondingly assigned to an associated reporting group in step 1220. In particular, as mentioned above, the nodes are configured to (under certain circumstances) redirect traffic to a root node of the DAG via the corresponding data aggregator of the reporting group. The root node/head-end application may then notify the assigned nodes and data aggregators of their associated reporting group in step 1225, and the procedure 1200 for the root node ends in step 1230, notably where the network nodes and data aggregators act in response to the assigned reporting groups, accordingly.

It should be noted, generally, that FIGS. 10-12 are merely examples for illustration, and are not meant to be limiting to the scope of the embodiments herein. For instance, while certain steps within the procedures 1000 through 1200 may be optional as described above, certain steps may be included or excluded as desired, and the steps may also be in a different order where suitable. Further, while a particular order of the steps is shown, this ordering is merely illustrative, and any suitable arrangement of the steps may be utilized without departing from the scope of the embodiments herein.

The novel techniques described herein provide efficient traffic redirection in the presence of dynamically discovered data aggregators. In particular, a system in accordance with the techniques herein discover data aggregators in the network and compute the path cost increase when redirecting some traffic via these aggregators. When events such as the detection of congestion takes places, candidate traffic for aggregation may be redirected thus bypassing the DAG path thanks to the use of source-routing tunnels. The techniques herein improve the network efficiency by optimizing data aggregation and rerouting traffic to reduce traffic volume if the path cost increase is acceptable.

Moreover, the techniques herein do not merely optimize routing according to the presence of aggregators, but detects the presence of data aggregators and potentially redirects the traffic through an aggregator according to the type of traffic, increased path cost, and network situation. For example, in a non congested network, it is not necessary to aggregate non-critical traffic. On the other hand, redirecting critical traffic via a non-shortest path (should the path cost increase be acceptable) can sometimes be highly beneficial. Indeed, in current networks with data aggregators, the routing topology can be tuned so as to direct traffic though aggregators, but the techniques herein take into account the presence of aggregators (not always along shortest paths) to decide whether to redirect some traffic if the path cost increase is acceptable.

As an example, AMI outage management may create traffic "storms" due to many alarms reporting an outage at the same time to a centralized management entity (e.g., head-end). According to the techniques herein, instead of sending a number of messages that provoke congestion and thus additional delays, messages would be redirected to a local data aggregator to aggregate the information and send one message out to the head-end, thus usually reducing delays. As described above, for example, wither the path cost increase is acceptable may be based on the expected delay caused by a traffic storm, e.g., such that the redirection to a data aggregator may occur when the delay associated with doing so is not worse than the delay expected/experienced when sending directly to the head-end.

In addition, the techniques described above provide for efficient establishment of routing groups in the computer network in the presence of data aggregators. For instance, the techniques herein assigns reporting groups (thus synchronizing sending of the data) according to the network topology and the presence of data aggregators, both of which being dynamically discovered. A system in accordance with these techniques improves the reliability of the delivery of metering data, increases the degree of aggregation and thus decreases the volume of data, and controls the scaling of meter data messages. In particular, by assigning report groups to nodes according to the presence of data aggregator, a significant reduction of the traffic in the network may be achieved for several applications (specifically for the messages which can be aggregated).

While there have been shown and described illustrative embodiments that provide efficient traffic redirection in the presence of dynamically discovered data aggregators, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols, particularly those that may be constrained or would otherwise benefit from the techniques herein. Also, while the techniques described above make reference to wireless communication or other shared media (e.g., PLC), other types of communication media (e.g., wired) may also be used. Further, although the primary example above relates to sensor networks such as AMI systems, the techniques above apply to many other kinds of telemetry/collection networks, or other networks that may benefit from the use of data aggregation and/or routing groups, particularly where a majority of the network traffic is P2MP or MP2P.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
generating a data aggregator discovery (DAD) message by a data aggregator in a directed acyclic graph (DAG) of a computer network, the DAD message identifying the data aggregator as being a node that aggregates data and configured to carry a recorded route taken from the data aggregator to corresponding receiving nodes as well as a total path cost including at least one hop for the corresponding receiving node to reach a root node of the DAG through the recorded route and via the data aggregator, wherein the data aggregator is a node between a root node and a destination address node in the computer network that is equipped with sufficient memory to handle an aggregation task;
distributing, by the data aggregator, the DAD message into the computer network without regard to the DAG;
receiving, at the data aggregator, redirected traffic from one or more of the corresponding receiving nodes, the received redirected traffic being source-routed traffic according to the recorded route in the DAD message; and
aggregating, by the data aggregator, the redirected traffic.

2. The method as in claim 1, further comprising:
learning of one or more reporting groups configured to redirect traffic via the data aggregator, the reporting groups each associated with an exclusive time at which nodes of the reporting groups are configured to redirect traffic; and
allowing each of the one or more reporting groups to redirect traffic at least once prior to aggregating the redirected traffic.

3. The method as in claim 2, wherein the reporting groups are configured based on a location of the data aggregator within the DAG.

4. An apparatus, comprising:
one or more network interfaces to communicate within a directed acyclic graph (DAG) in a computer network;
a processor coupled to the network interfaces and adapted to execute one or more processes; and
a memory configured to store a process executable by the processor, the process when executed operable to:
generate a data aggregator discovery (DAD) message in a directed acyclic graph (DAG) of a computer network, the DAD message identifying the apparatus as a data aggregator that operates as a node that aggregates data and configured to carry a recorded route taken from the apparatus to corresponding receiving nodes as well as a total path cost including at least one hop for the corresponding receiving node to reach a root node of the DAG through the recorded route and via the apparatus as the data aggregator, wherein the data aggregator is a node between a root node and a destination address node in the computer network that is equipped with sufficient memory to handle an aggregation task;

distribute the DAD message into the computer network without regard to the DAG;

receive redirected traffic from one or more of the corresponding receiving nodes, the received redirected traffic being source-routed traffic according to the recorded route in the DAD message; and aggregate the redirected traffic.

5. The apparatus as in claim 4, wherein the process when executed is further operable to:

learn of one or more reporting groups configured to redirect traffic via the apparatus as the data aggregator, the reporting groups each associated with an exclusive time at which nodes of the reporting groups are configured to redirect traffic; and allow each of the one or more reporting groups to redirect traffic at least once prior to aggregating the redirected traffic.

6. The apparatus as in claim 5, wherein the reporting groups are configured based on a location of the apparatus as the data aggregator within the DAG.

7. A method, comprising:

determining, by a root node, a location of one or more data aggregators in a directed acyclic graph (DAG) of nodes in a computer network, wherein the one or more data aggregators are nodes identified to the root node in a data aggregator discovery (DAD) message as being a node that aggregates data and are located between the root node and a destination address node in the computer network that are equipped with sufficient memory to handle an aggregation task;

establishing, by the root node, one or more reporting groups based on the location of the one or more data aggregators in the DAG, the reporting groups each associated with an exclusive time at which nodes of the reporting groups are configured to redirect traffic, each reporting group based locally on a corresponding data aggregator; and assigning, by the root node, nodes within the DAG to an associated reporting group, the nodes configured to redirect traffic to the root node of the DAG via the corresponding data aggregator of the reporting group; and notifying, by the root node, the assigned nodes and data aggregators of their associated reporting group.

8. The method as in claim 7, wherein a particular data aggregator of the one or more data aggregators in the DAG corresponds to a plurality of reporting groups, and wherein the particular data aggregator is configured to allow each of the plurality of reporting groups to redirect traffic at least once prior to aggregating the redirected traffic.

9. An apparatus, comprising:

one or more network interfaces to communicate within a directed acyclic graph (DAG) in a computer network;

a processor coupled to the network interfaces and adapted to execute one or more processes; and a memory configured to store a process executable by the processor, the process when executed operable to:

determine a location of one or more data aggregators in a directed acyclic graph (DAG) of nodes in a computer network, wherein the one or more data aggregators are nodes identified to the apparatus in a data aggregator discovery (DAD) message as being a node that aggregates data and are located between the apparatus and a destination address node in the computer network that are equipped with sufficient memory to handle an aggregation task, wherein the apparatus is a root node;

establish one or more reporting groups based on the location of the one or more data aggregators in the DAG, the reporting groups each associated with an exclusive time at which nodes of the reporting groups are configured to redirect traffic, each reporting group based locally on a corresponding data aggregator; and assign nodes within the DAG to an associated reporting group, the nodes configured to redirect traffic to a root node of the DAG via the corresponding data aggregator of the reporting group; and notify the assigned nodes and data aggregators of their associated reporting group.

10. The apparatus as in claim 9, wherein a particular data aggregator of the one or more data aggregators in the DAG corresponds to a plurality of reporting groups, and wherein the particular data aggregator is configured to allow each of the plurality of reporting groups to redirect traffic at least once prior to aggregating the redirected traffic.

11. The method as in claim 10, wherein the reporting groups are configured based on a location of the data aggregator within the DAG.

* * * * *